J. L. REIDER.
SIDE CURTAIN FOR VEHICLE TOPS.
APPLICATION FILED NOV. 21, 1917.
1,363,351.
Patented Dec. 28, 1920.
2 SHEETS—SHEET 1.
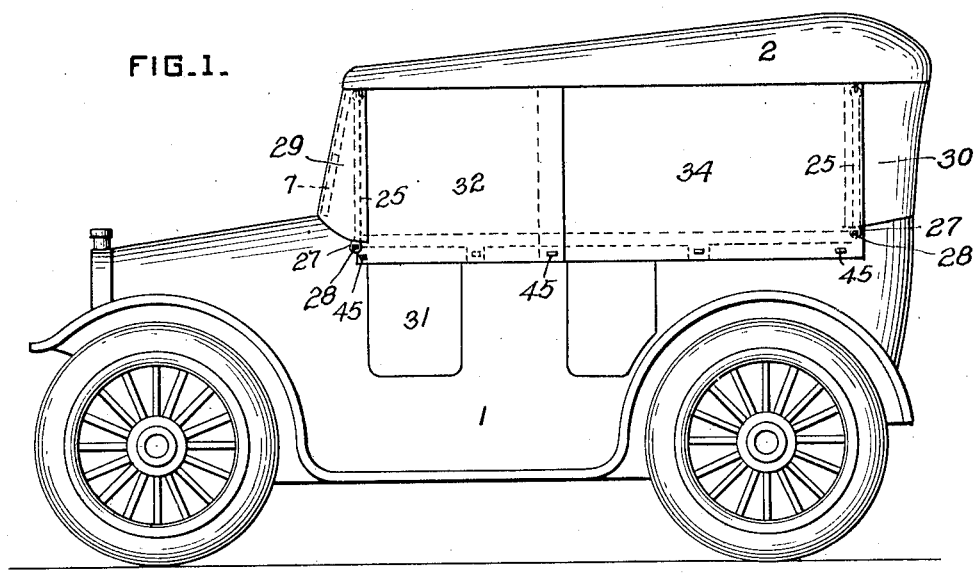
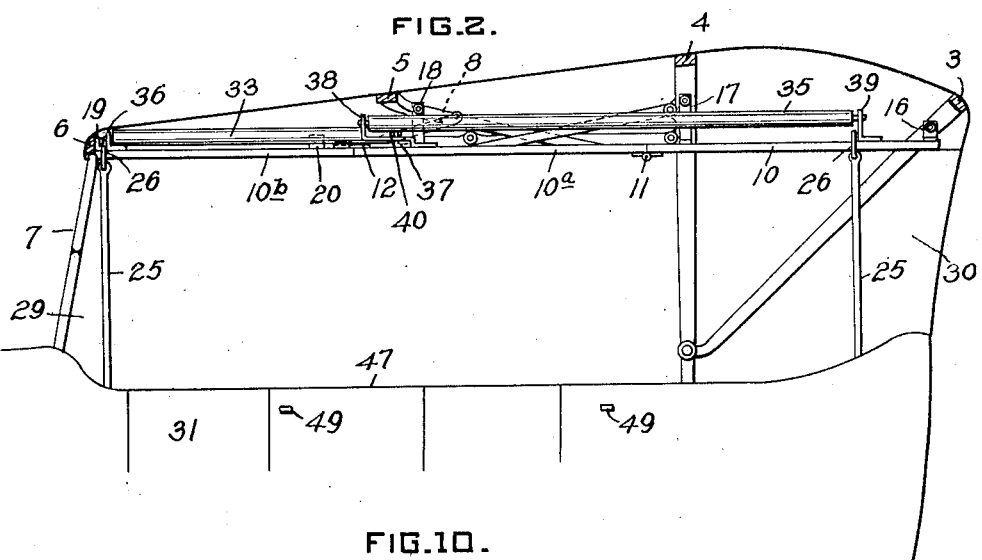
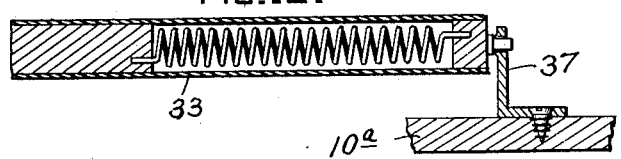
WITNESSES
J. Herbert Bradley.
J. H. Leresche.
INVENTOR
John L. Reider,
By Fred'k H. Winter
Attorney

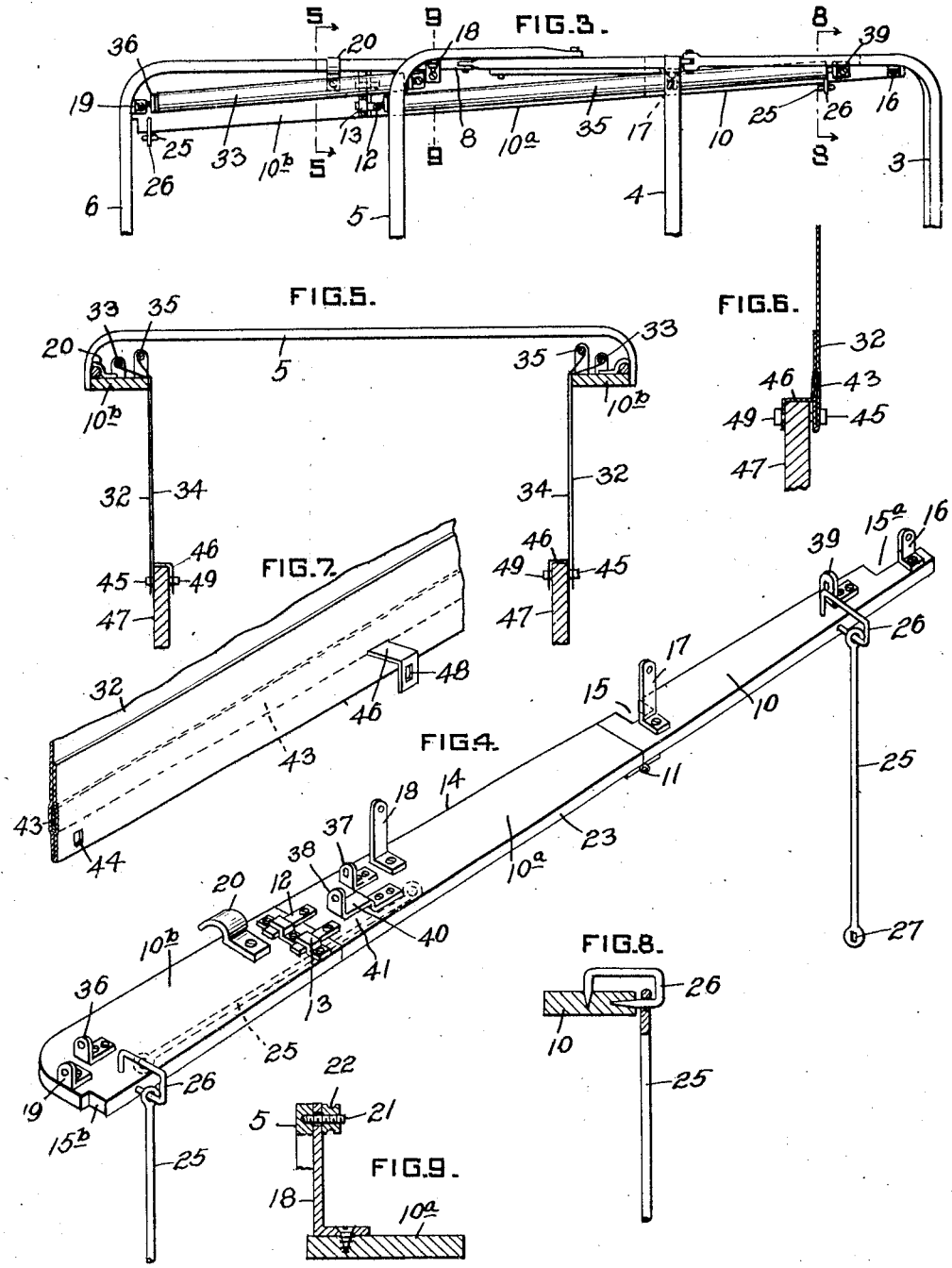

UNITED STATES PATENT OFFICE.

JOHN L. REIDER, OF PITTSBURGH, PENNSYLVANIA, ASSIGNOR OF ONE-THIRD TO HARRY E. URBAN AND ONE-THIRD TO WILLIAM B. BROWN, BOTH OF PITTSBURGH, PENNSYLVANIA.

SIDE CURTAIN FOR VEHICLE-TOPS.

1,363,351.     Specification of Letters Patent.     Patented Dec. 28, 1920.

Application filed November 21, 1917. Serial No. 203,243.

*To all whom it may concern:*

Be it known that I, JOHN L. REIDER, a resident of Pittsburgh, in the county of Allegheny and State of Pennsylvania, have invented a new and useful Improvement in Side Curtains for Vehicle-Tops, of which the following is a specification.

This invention relates to side curtains for vehicle tops, and more especially for use on automobiles or similar vehicles having a folding top. The object of the invention is to provide a side curtain arrangement for vehicles in which the curtains can be applied to close the sides, or rolled up to open up the sides, much more quickly and with less trouble than with side curtains as heretofore made and arranged.

In the accompanying drawings, Figure 1 is a side elevation of an automobile showing the side curtains closed; Fig. 2 is a central longitudinal section through the automobile top showing the arrangements of the curtain supports from the inside; Fig. 3 is a plan view of the bows and curtain supporting means on one side of the car, with the cover removed; Fig. 4 is a perspective view of the curtain supporting means as an entirety, but with the curtain rollers omitted; Fig. 5 is a transverse vertical section through the top and curtains, taken substantially on the line 5—5 of Fig. 3; Fig. 6 is an enlarged detail sectional view showing the fastening means at the lower edges of the curtains; Fig. 7 is a perspective view of the same; Fig. 8 is an enlarged sectional view taken substantially on the line 8—8 of Fig. 3; Fig. 9 is a similar view taken on the line 9—9 of Fig. 3; and Fig. 10 is a sectional detail view of one of the rollers.

In general, the invention comprises side curtains for vehicles mounted on spring rollers so that they can be closed by drawing them down in the manner of ordinary window shades, and can be opened by merely allowing them to roll up under the action of the spring. The invention comprises suitable arrangement of means for mounting such spring roller curtains in the vehicle top at both sides, and in a manner which permits the supporting means to be readily removed to allow the top to be folded down.

In the accompanying drawings, the invention has been shown applied to one form of folding automobile top, and which is known in the trade as a "one man" top, but it will be understood that the construction illustrated can be applied to any form of vehicle top, by suitably changing the form and proportions of the roller supporting means.

In the drawings, 1 indicates the vehicle body and 2 the top as a whole, which as above stated, is illustrated as the "one man" type, having a number of bows for supporting the top, to-wit, a rear bow 3, a rear intermediate bow 4, a front intermediate bow 5, and an extreme front bow 6, the latter lying above and slightly in front of the wind shield 7. In this "one man" type, the bow 6 lies in substantially a horizontal position, and is connected to the bow 5 by a toggle member 8, and the bow 5 also lies only slightly inclined from a horizontal position. This is merely illustrative of one form of top to which the invention can be applied.

The device comprises a suitable rigid curtain roller support 10, which is shown in the form of a board lying horizontally and extending from the front to the rear of the car, one on each side of the top. For convenience in storing when the top is to be put down, this curtain roller support is made collapsible, and, is shown formed in three sections, to-wit, a rear section, 10, an intermediate section 10$^a$, and a forward section 10$^b$. The rear and intermediate sections are united by means of a hinge or hinges 11 to permit them being folded together, and the forward section 10$^b$ is detachably connected to the intermediate section by means of straps or tongues 12 secured to one of the parts and entering suitable sockets 13 on the other part.

This curtain roller support lies immediately underneath the top 2 at the side edges, and substantially at the lower edge of the down curved portion 2$^a$ of said top. It is made of a length to extend from end to end of the top and has its outer edge 14 formed on a contour to fit against the top, with suitable notches as at 15 and 15$^a$, to fit around the bows of the top, and a notch 15$^b$ fitting against the wind shield at the forward end. It is removably secured to the top in any suitable way, the drawings showing for this purpose, a bracket 16 at the rear end for securing the same to the rear bow 3; a bracket 17 for securing the same to the rear intermediate bow 4; a similar bracket 18 for securing it to the front intermediate bow 5; a bracket 19 for securing it to the front bow 6 at the wind shield, and a bracket 20 which fits over the horizontal portion of the bow 6. This specific bracket arrangement is adapted for securing the support to a top having bows such as illustrated in the drawings, but it will be understood that these means will be modified to adapt the curtain roller support to vehicle tops having different arrangements of bows. As a convenient means for detachably fastening the several brackets to the bows, the brackets 16, 17, 18, and 19 are provided at their upper ends with perforations which fit over stud bolts 21 secured to the bows and receiving ordinary thumb nuts 22, while the bracket 20 has a curved portion which fits over the horizontal portion of the bow 6. This provides a simple means for detachably mounting the curtain roller support in the top and holding it firmly in position.

The inner edge 23 of said curtain roller support extends substantially parallel with the top of the vehicle body and lies substantially directly above the same.

In order to "square" the side openings, so that roller curtains can be applied thereto, suitable vertical members are provided at the front and rear, and extending from this curtain roller support to the vehicle body, and which serve as attaching means for the edges of supplementary end curtains which are not mounted on rollers. As shown, both at the front and rear end there is a vertical rod 25 provided at its upper end with an eye fitting a loop member 26 secured to the support 10 so as to permit the rod 25 to be folded up on top of the member 10, as shown in dotted lines at the forward end of Fig. 1, and which member at its lower end is provided with an eye 27 which is secured to an ordinary turn button 28 on the vehicle body, such as the turn buttons now used for fastening the edges of curtains. Supplementary curtain sections 29 are provided at the front end, extending from the ends of the wind shield to the front vertical rods 25 and secured to both, and at the rear end, corresponding supplementary curtain sections extend from the rear portion of the vehicle top to and are secured to the rear rods 25. By the means described there is provided a substantially rectangular opening on each side of the vehicle top extending between the rods 25 at the forward and rear ends, respectively,—and which rectangular opening is closed by means of spring roller mounted curtains. The number of such curtains on each side will depend upon the length of the car, the drawings showing an arrangement for a short car in which two rollers on each side are provided, but with longer cars it is preferred to have three rollers on each side.

As illustrated, at the front end of the car, opposite the front door 31 and the driver's seat, is one curtain 32, mounted on a roller 33, which is mounted on top of the support 10, and the remainder of the side opening is closed by another curtain 34 mounted on a roller 35, also mounted on top of support 10. These rollers 33 and 35 are of the well known spring-actuated type. The front roller is mounted in brackets 36 and 37 secured to the upper face of the support 10, and the rear roller is mounted in brackets 38 and 39, also secured to the upper face of the support 10. It is desirable that the meeting edges of the curtains overlap, so as to prevent entrance of wind and rain therebetween, and such overlapping preferably must be with the rear edge of the front curtain lying outside the forward edge of the rear curtain. Consequently the supporting brackets for the front roller are set outside of those for the rear roller, as shown in Fig. 4, and in order to permit the rear edge of the front curtain to pass the bracket 38 for the forward edge of the rear curtain, this bracket is formed with a raised or offset portion 40 which provides underneath the same a space 41, through which the rear edge of the front curtain can pass. Consequently the meeting edges of adjacent curtains overlap and form a complete closure. In case three rollers are necessary, the bracket at the forward end of the two rearmost curtains will be of the construction illustrated for the bracket 38.

Means are provided for fastening the lower edges of the curtain to the vehicle body either from the inside or the outside so that the occupants of a car can pull down the curtains and fasten them from the inside, and also so that the curtains can be pulled down and fastened on the outside when leaving the car standing outdoors. As a suitable fastening means for this, and in order to reduce the number of fastening means, there is inserted in a loop in the lower edge of each curtain a rigid strip 43, which may be a small rod, but preferably is a flat strip of metal or the like. This holds the lower edges of the curtain straight and substantially rigid and requires only one, or at the most two fastening means to each curtain. For fastening to the outside of the vehicle body the lower edge of the curtain is provided with an opening 44 which can be passed over an ordinary turn button 45, while for fastening to the inside of the vehicle body, the strip 43 is provided with a tongue 46, which projects inwardly and then downwardly, so as to fit over the top edge 47 of the vehicle body, and the downturned portion is provided with an opening 48 fitting over an ordinary turn button 49.

The curtain rollers 33 and 35 are mounted on top of the support 10, so that when said curtains are closed, they are drawn tightly over the inner edge of said support 10. The springs of the rollers will be made quite strong so as to hold the curtains absolutely taut, and since the meeting edges of adjacent curtains overlap as shown, a complete closure for the side of the car is provided.

With the arrangement shown, the sides of the car can be quickly closed from the inside without the necessity of either getting out of the car, or reaching outside of the same. They can be opened up in equally short time by merely unfastening the lower edges of the curtains whereupon the spring rollers automatically roll up the curtains and store them away in the top, entirely out of the way. Also the curtains can be very quickly closed and fastened from the outside as is desirable when leaving the car standing outdoors in inclement weather.

When it is desired to lower the top the curtain rollers will be removed from their brackets, the lower ends of the rods 25 released from the body, and the support 10 removed by loosening thumb nuts 22, whereupon said support can be folded, and together with the curtain roller stored underneath the seat, or other suitable storage place.

The arrangement illustrated is intended merely for one size of vehicle and for one construction and arrangement of the bows for such tops. The device can be adapted to any form of top, by properly proportioning and shaping the member 10, notching it out to pass around the bows wherever they are located and locating the supporting brackets in position to fasten to the bows.

What I claim is:

1. A side curtain arrangement for foldable vehicle tops comprising, in combination, curtain supports extending longitudinally of the top, said supports being horizontally disposed and having their outer edges conforming to and fitting against the sides of the top and having their inner edges straight, spring rollers carrying curtains mounted on said supports and arranged to have the curtains pulled laterally and downwardly over and in contact with the inner straight edges of the supports, and means for fastening the lower edges of the curtain to the vehicle body.

2. A side curtain arrangement for foldable vehicle tops comprising, in combination, curtain supports formed in collapsible sections and extending longitudinally of the top, said supports being horizontally disposed and having their outer edges conforming to and fitting against the sides of the top and having their inner edges straight, spring curtain rollers mounted on the top of said supports and arranged to have the curtain pulled downwardly therefrom over and in contact with the straight inner edges of said supports, and means for fastening the lower edges of the curtain to the vehicle body.

3. A side curtain arrangement for foldable vehicle tops comprising, in combination, curtain supports extending longitudinally of the top and being horizontally disposed and having their outer edges conforming to and fitting against the sides of the top and having their inner edges straight, detachable means for connecting said supports to the bows of the collapsible top, spring curtain rollers mounted on said supports and arranged to have the curtain pulled therefrom laterally and downwardly over and in contact with the straight inner edges of the supports and means for fastening the lower edges of the curtains to the vehicle body.

4. A side curtain arrangement for collapsible vehicle tops comprising, in combination, curtain supports extending longitudinally of the top and being horizontally disposed and having their outer edges conforming to and fitting against the sides of the top and having their inner edges straight, spring curtain rollers mounted on top of said supports and arranged to have the curtain pulled therefrom over and in contact with the straight inner edges of said supports, brackets for mounting said spring rollers, the brackets at the forward edge of the curtains to the rear being constructed to permit the rear edges of the forward curtain to pass underneath the same, and means for fastening the lower edge of the curtain to the vehicle body.

In testimony whereof, I have hereunto set my hand.

JOHN L. REIDER.

Witness:
GLENN H. LERESCHE.